United States Patent [19]

Kelley

[11] 4,150,215
[45] Apr. 17, 1979

[54] PROCESS FOR PREPARING CATALYST-FREE POLYESTER

[75] Inventor: Mellis M. Kelley, Akron, Ohio

[73] Assignee: The Goodyear Tire & Rubber Company, Akron, Ohio

[21] Appl. No.: 919,889

[22] Filed: Jun. 28, 1978

Related U.S. Application Data

[63] Continuation-in-part of Ser. No. 877,455, Feb. 13, 1978.

[51] Int. Cl.$^2$ ............................................. C08G 63/26
[52] U.S. Cl. ................................................... 528/272
[58] Field of Search ......................................... 528/272

[56] References Cited

U.S. PATENT DOCUMENTS

| | | | |
|---|---|---|---|
| 3,330,809 | 7/1967 | Perlowski et al. | 260/75 M |
| 3,475,379 | 10/1969 | Hilaire | 260/75 R |
| 3,497,477 | 2/1970 | Barkey et al. | 260/75 M |
| 3,594,350 | 7/1971 | Lofquist et al. | 260/75 R |

*Primary Examiner*—Lucille M. Phynes
*Attorney, Agent, or Firm*—J. P. Ward

[57] ABSTRACT

The invention relates to a process for preparing high molecular weight polyester resin by reacting ethylene glycol with terephthalic acid in the absence of a catalyst and polymerizing the product under solid state polymerization conditions to form high molecular weight polyester.

1 Claim, No Drawings

PROCESS FOR PREPARING CATALYST-FREE POLYESTER

This application is a continuation-in-part of my Application Ser. No. 877,455, filed Feb. 13, 1978.

This invention relates to a process for preparing a high molecular weight polyethylene terephthalate polyester polymer that has improved stability.

Heretofore it has been the practice to try to improve the stability of polyester resins by adding chemical stabilizers to such resins. In addition, materials are added which cap free carboxyl groups or otherwise reduce the amount of free carboxyl groups in the resin.

Now it is known that the presence of foreign materials affects resin stability and that catalysts that are effective in promoting esterification or transesterification and condensation and molecular weight build up also cause degradation reactions after polymer is made and put under stress such as exposure to heat or hydrolytic conditions. Some attempts have been made to eliminate these after effects of catalysts by adding materials that may form complexes with the catalyst residues and deactivate them.

In the prior art it has been suggested that in the preparation of polyester by esterification to form bis hydroxyethyl terephthalate or oligomers which are subsequently polymerized to form high molecular weight polymer the esterification can be run without a catalyst (U.S. Pat. Nos. 3,050,533 and 3,427,287). However, it was believed a condensation catalyst such as antimony trioxide or titanium glycolate had to be used to provide for polymerization to form high molecular weight polyester.

I have unexpectedly found that a high molecular weight polyester entirely free of catalyst can be made at commercially feasible rates by the solid state condensation of catalyst-free low molecular weight polymer or oligomer having an intrinsic viscosity of from 0.1 to about 0.4, a particle size of 20 mesh or less and a free carboxyl group concentration such that the polymerization can proceed by both transesterification and esterification.

Low polymer is prepared in a metal reactor capable of being operated at pressures above atmospheric. This reactor is equipped with agitation, facilities for heating and a condenser for distillation of by-products.

17.3 pounds of ethylene glycol and 20.8 pounds of terephthalic acid were added to the reactor. The reactor was pressurized with nitrogen to 35 pounds per square inch and this pressure was maintained throughout the preparation of the low polymer. Agitation was started and heat applied to the reactor. The progress of the reaction was followed by monitoring the temperature of the reaction mixture and the temperature of the head of the condenser. Initiation of esterification is noted by a sharp increase in temperature of the head of the condenser and the collection of water distilled off as a by-product. As esterification progresses an increase in the temperature of the reaction mixture is also noted. Completion of the reaction forming the low polymer is indicated by a drop in the condenser head temperature and is accompanied by the temperature of the reaction mixture reaching approximately 270° C. Time for this reaction is approximately 3½ hours. After completion of this step the low molecular weight polymer had an intrinsic viscosity of 0.100 and a carboxyl value of 403 equivalents per $10^6$ grams polymer.

One hundred grams of the above product was placed in a glass tube reactor with 5 milliliters of ethylene glycol. A test tube containing toluene was inserted in the top of the glass tube reactor to act as a cold finger to prevent loss of glycol when the mixture is heated. Nitrogen gas was slowly passed through the mixture in the glass tube reactor. The temperature was raised to 260° C. and maintained at this point for one hour. Then the cold finger was removed from the tube reactor. The temperature was raised to 280° C. and the pressure gradually reduced over a period one hour to 0.05 millimeter of mercury pressure for about 15 minutes, when the mixture became very viscous. Any excess glycol is also removed during this step. The pressure was brought to atmospheric pressure and the low polymer was removed from the reactor. It was cooled and ground to pass a 40 mesh screen. The low polymer had an intrinsic viscosity of 0.193 and a carboxyl group concentration of 11 equivalents per $10^6$ grams of polymer.

A 50 gram sample of the ground low polymer was placed in a fluid bed polymerization apparatus. Preheated nitrogen gas was passed through the polymer at the rate of 5 cubic feet per hour at 240° C. for 1½ hours; 245° C. for 1½ hours and then at 250° C. for 3½ hours. The polymer obtained had an intrinsic viscosity of 0.942 (as determined in a 60/40 phenol/tetrachloroethane mixed solvent at 30.0° C.) and a free carboxyl group concentration of 0 equivalents per $10^6$ grams of polymer.

In the above example the resin was ground to pass a 40 mesh screen before it was subjected to solid state polymerization. Somewhat larger particles can be used. The particles will generally be in the range of from about 20 mesh to 40 mesh (U.S. Standard) size.

While certain representative embodiments and details have been shown for the purpose of illustrating the invention it will be apparent to those skilled in this art that various changes and modifications may be made therein without departing from the spirit or scope of the invention.

What I claim is:

1. The process which comprises preparing a catalyst-free low molecular weight polyester having an intrinsic viscosity of from 0.1 to 0.4 by reacting ethylene glycol with terephthalic acid in the presence of catalyst-free low molecular weight polyester, grinding or otherwise reducing the particle size of the low polymer to 20 mesh or less to form low molecular weight polyester have a free carboxyl content of less than 25 equivalents per $10^6$ grams of polymer and subjecting the low molecular weight polyester thus prepared to solid state polymerization in fluid bed or static bed process to form high molecular weight polyester.

* * * * *